June 7, 1966   J. J. J. STAUNTON   3,254,556
COMPOSITE OPTICAL PRISM UNIT
Filed May 29, 1961   3 Sheets-Sheet 1
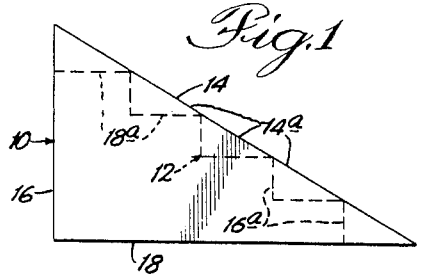
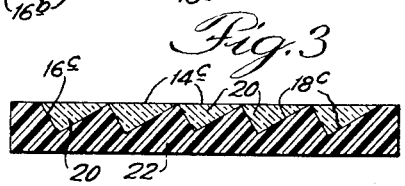
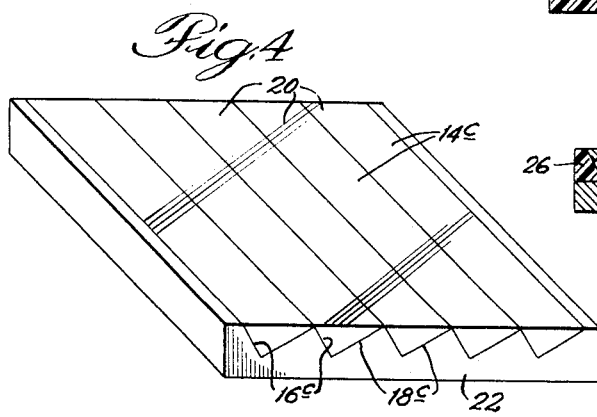
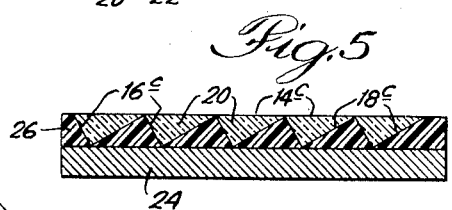
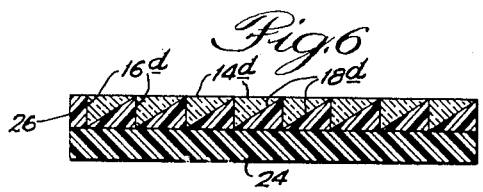
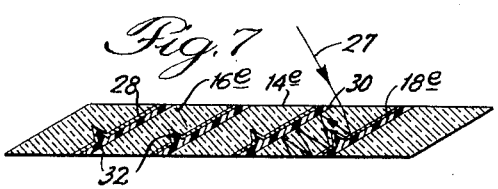
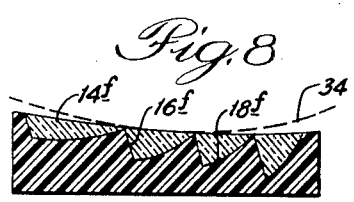
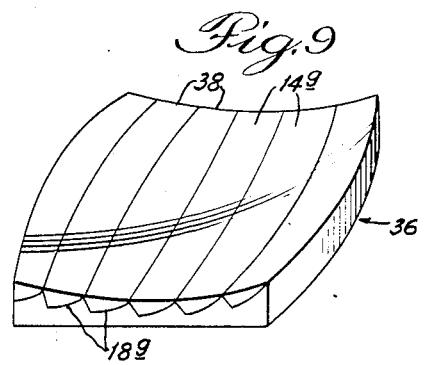
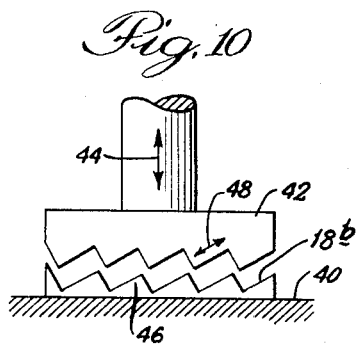
INVENTOR:
John J. J. Staunton,
BY
Bair, Freeman & Molinare
ATTORNEYS.

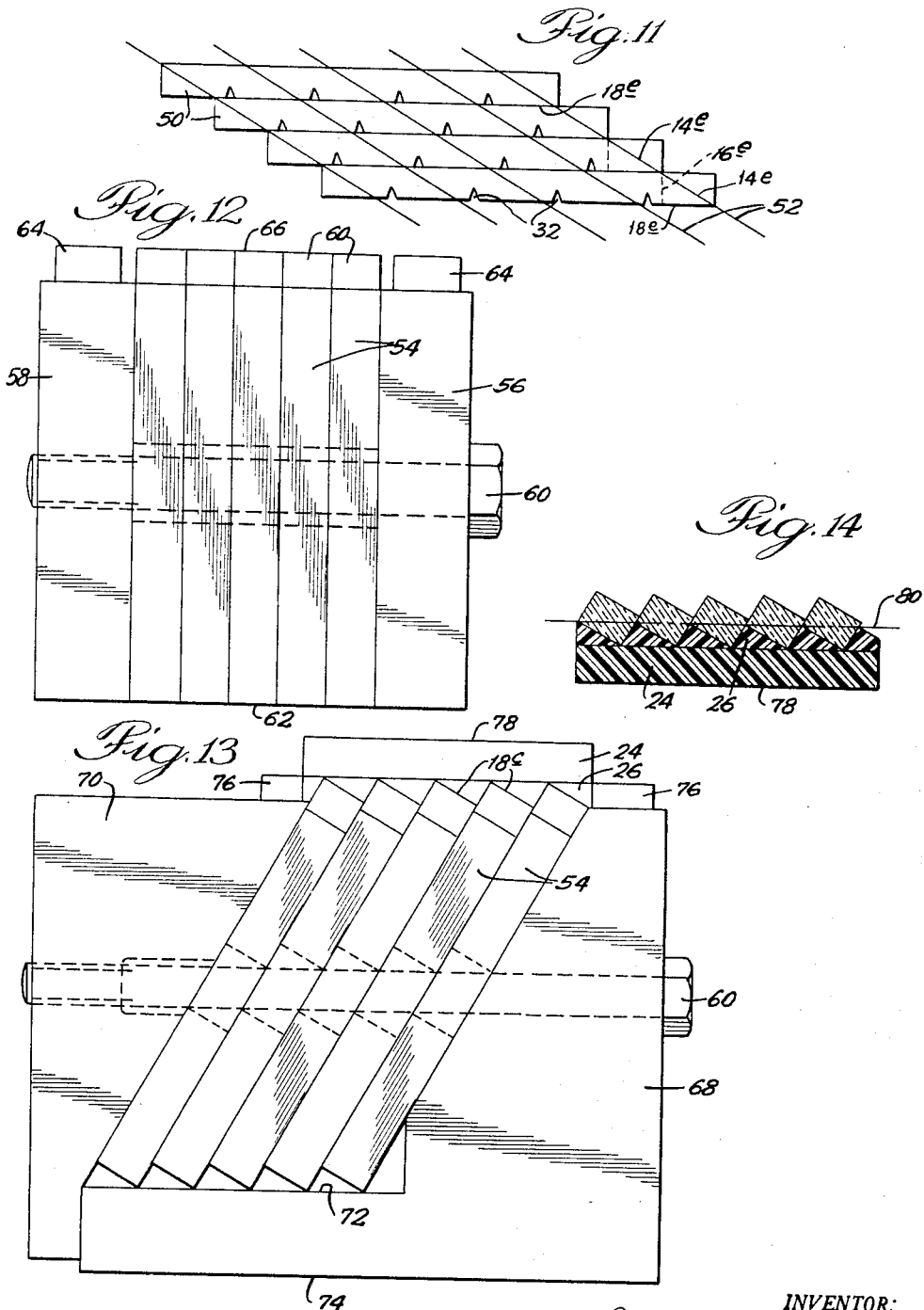

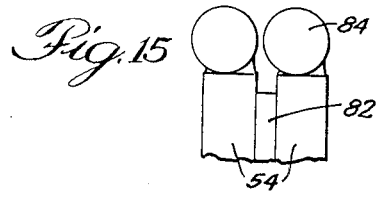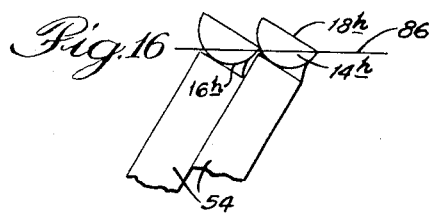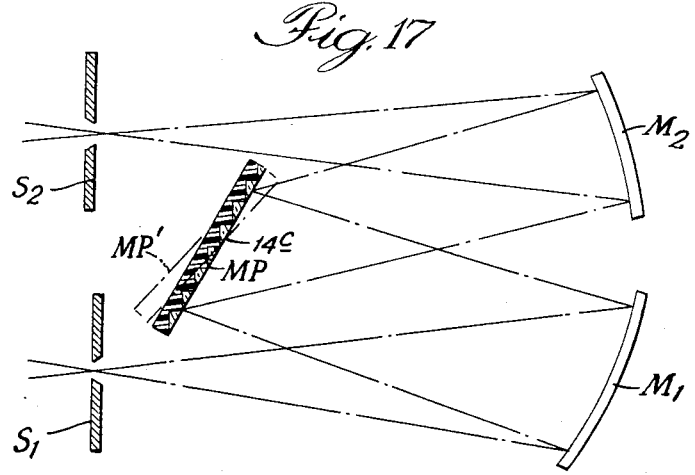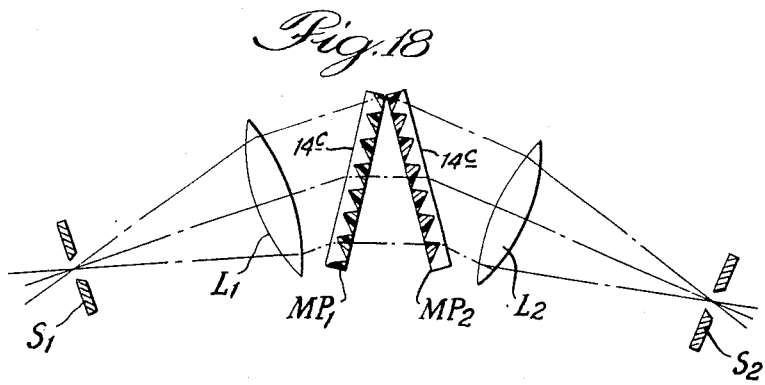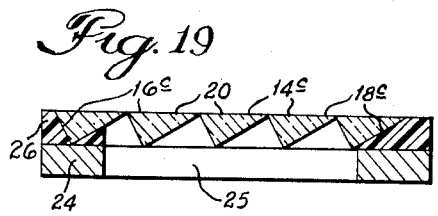

3,254,556
COMPOSITE OPTICAL PRISM UNIT

John J. J. Staunton, Oak Park, Ill., assignor, by mesne assignments, to Coleman Instruments Corporation, Maywood, Ill., a corporation of Delaware
Filed May 29, 1961, Ser. No. 113,469
5 Claims. (Cl. 88—1)

This invention relates to a novel form of optical prism unit whose function is primarily to disperse an optical beam into a spectrum, and secondarily when so constructed, to focus this beam and thereby reduce the number of components required in the optical system. Primarily this unit is a form of optical prism; secondarily, it may also be a lens or a curved mirror.

The prism is commonly used in such instruments as spectrometers and spectrophotometers, where its function is to disperse an optical beam containing a multiplicity of wave lengths of radiation into a spectrum wherein these wave lengths are displayed in serial order for the purpose of selecting therefrom a narrow group of known wave length range for measurement reasons. The prism as so used may be the only dispersing means of a single monochromator, or it may be used as an order sorter or secondary dispersing means in a double monochromator where another prism or a grating is the primary dispersing means. As a primary dispersing means, the angles and surfaces of the prism must be very accurately worked to realize the precision of optical control necessary for high resolution, that is, accurate distinction between adjacent wave lengths. When used as a secondary dispersing means more leeway in angle and surface precision is generally permissable, since the onus of producing high resolution falls on the primary dispersing component. The significance of these distinctions will be more apparent later.

In the prior art, whether used as a primary or secondary dispersion means, the usual prism is a right prism of triangular cross section, though several other cross sections each having its peculiar advantages have been used. The faces of the prism through which the light passes are polished accurately plane, usually to within a fringe, i.e., 10 microinches. The face, or faces, through which the light does not pass are usually left in a fine ground condition. An exception to the plane face rule is the Fery prism which has spherical curvature of the polished faces to act as image forming surfaces for the purpose of eliminating one or more lenses or curved mirrors which would otherwise be needed to focus or parallelize the beam passing through the system. A triangular prism through which the light passes once is known as a Bunsen prism; if the light is reflected from the second face of the prism or from a mirror behind the prism and returned back through the prism, leaving by the face through which it entered, the prism is known as a Littrow prism. The details of optical systems using either type of prism are conventional and are not a part of this invention.

When the prior art investigators worked in the visible regions from about 400 to 700 millimicrons wave length, the simple prism made from glass functioned well. However, as the limits of investigation were pushed out into the infrared beyond about 2.7 microns, the glass prism became gradually, sometimes suddenly, opaque in these regions, and investigators found it necessary to go to such materials as quartz, rock salt, or potassium bromide to secure the transparency coupled with dispersive power necessary to make an effective prism. Each of these materials shows high dispersion or a rapid change of refractive index with wave length in some particular region with a gradual decrease of dispersion in other regions. Generally, the highest dispersion is associated with approach to a region of high absorption, hence the region in which the prism separates wave lengths best is also the region in which it begins to refuse to transmit. Trouble then results; either the user must be content with low dispersion but good transparency of the prism, or he finds that the thicker part of his prism begins to become opaque as the wave length changes, passing the beam only through the thin part or vertex of the prism; eventually the whole prism fails to transmit. This same state of affairs manifests itself as measurements are pushed farther into the shorter ultraviolet wave lengths, glass cutting off at about 300 millimicrons and quartz in the vicinity of 160 to 200 millimicrons. Further down, to about 110 millimicrons, lithium fluoride may be used. The relationship between dispersion and proximity to the absorption limits holds in this region also.

The increasing availability of good diffraction gratings as primary dispersing means with their superior and more constant dispersion relieved the situation for users of single monochromators but the problem remains for spectrophotometers. Gratings produce a plurality of overlapping spectra which interfere with one another in spectrophotometric measurements. The ideal way of removing all except the desired spectral order is a second monochromator, but a grating cannot be used as the secondary dispersion means because it will not pass just one order. So the problem of limited prism range and of widely varying dispersion and distortion of the optical beam near absorption limits is still a factor in the design of the second monochromator. Also, especially in the infrared, the desirability of using very large beam cross sections for increasing response increases the size of components and requires that the prism be a large costly item. The large size of the prism, of course, aggravates the problem of absorption at spectral extremes and at any absorption bands the prism material may possess in mid range.

An important object of the invention is to provide a small size, light weight, readily and simply mounted, and low cost optical prism unit. A particular object is to provide such a unit which is adapted for use in a spectrophotometer, in monochromators in general, and in spectrographs.

Another object is to provide a prism unit which is characterized by increased optical efficiency, and particularly by high dispersion coupled with low absorption.

Another object is to provide a unit which furnishes increased homogeneity of optical beam cross section.

A further object is to provide a unit which reduces the amount of stray light in the system.

Other objects include the provision of a unit adapted for increasing the available dispersion, widening the operating range, synthesizing new dispersion curves previously unobtainable, and reducing the number of optical components in the system.

Further objects include the provision of new and improved methods of manufacturing the optical prism unit.

These and other objects, advantages and functions of the invention will be apparent on reference to the specification and to the attached drawings illustrating preferred embodiments of the invention, in which like parts are identified by like reference symbols in each of the views and in which:

FIGURE 1 is an end elevational view of a prior art prism and a prism unit according to the invention outlined thereon;

FIGURE 2 is a cross-sectional view of a monolithic form of the new prism unit;

FIGURE 3 is a cross sectional view of an embodiment of the prism unit including a matrix adhered to individual prisms thereof;

FIGURE 4 is a perspective view of the embodiment of FIGURE 3;

FIGURE 5 is a cross-sectional view like FIGURE 3, illustrating the use of a backing plate or frame on the unit;

FIGURE 6 is a modification of the embodiment of FIGURE 5 in which the bases of the individual prisms form light traps;

FIGURE 7 is a cross sectional view of another embodiment of the prism unit which functions as a light trap;

FIGURE 8 is a cross-sectional view of an embodiment of the prism unit adapted to focus an optical beam;

FIGURE 9 is a perspective view of an embodiment similar to FIGURE 8 illustrating axial curvature of the individual prisms;

FIGURE 10 is a schematic elevational view illustrating apparatus for and a method of manufacturing the embodiment of FIGURE 2;

FIGURE 11 is a schematic plane view illustrating a method of manufacturing the embodiment of FIGURE 7;

FIGURES 12 and 13 are side elevational views, and FIGURE 14 is a cross-sectional view illustrating apparatus and a method for manufacturing a prism unit such as illustrated in FIGURE 5;

FIGURES 15 and 16 are fragmentary side elevational views similar to FIGURES 12 and 13 illustrating a method of manufacturing a prism unit having curved prism bases;

FIGURE 17 is a schematic view showing a prism unit such as illustrated in FIGURE 3, employed in a simple Littrow monochromator;

FIGURE 18 is a schematic view showing two prism units employed in a double dispersion Bunsen monochromator; and FIGURE 19 is a view similar to FIGURE 5 showing an opening through a matrix and backing plate.

As the most elementary basic form of the invention, the bulky prior art prism 10 is replaced by a light, thin multi-element prism 12 outlined thereon, as shown in FIGURE 1. In this figure, the sides 14, 16 and 18 represent respectively the transparent hypotenuse, the ground base and the reflecting back face of a conventional Littrow prism. The corresponding lettered numbers 14a, 16a and 18a, represent the corresponding components of a plurality of prism elements which, properly aligned, will perform all the functions of the prior art prism in a superior manner. When these elements are made up, either as a monolithic unit or as an assembly held in a suitable matrix as shown in several forms in the successive illustrations, the basic, simplest form of the invention is provided which, for the sake of simplicity, will be called the "multiprism." This basic multiprism may be made with sides 14a coplanar as shown, with other sides such as 18a coplanar, or, as will be further discussed hereinafter, it may be desirable to use other orientations for their peculiar advantages. In the course of this disclosure, a particular arrangement may be referred to for purposes of illustration, but it is to be understood that the invention is not limited thereto.

Referring to FIGURE 2, which shows the multiprism as a monolithic form 19, surface 14b is the entrance face as in FIGURE 1, faces 16b are the bases of the successive prism components, and surfaces 18b are the exit or reflecting faces. The light path is illustrated by the arrows 21. Both of the surfaces 14b and 18b are polished accurately flat to a degree required for the specific use and in accordance with the usual practices in the art. The interval between corresponding parts of adjacent prism elements, or prismlets, may be of the order of 0.1 inch, although larger or smaller spacings may be used as required. The thickness of this form is somewhat greater than subsequent forms to be discussed on account of the necessity of providing rigid attachment between prismlets; this is one disadvantage of this form. Another is the difficulty of polishing. For these reasons, the preferred embodiments lie in the following constructions.

In FIGURES 3 and 4, the prismlets 20 are separate pieces supported by a matrix 22. This matrix may be of a variety of materials, preferably chosen to have a temperature coefficient of expansion approximating that of the prismlets, and may be formed by the same process as used to rough out monolithic form 19, described subsequently. Alternatively, the matrix may be a metal investment casting or a forged or molded unit. In any of these cases, the prismlets are attached to the matrix by cementing with a suitable cement such as an epoxy resin. The entire matrix may be an epoxy casting, silica filled and cast in place, and may also have sockets or mounting studs cast into it.

Variations of the above embodiment are shown in FIGURES 5 and 6. In these the rigid back is a flat plate or frame 24 attached to the prismlets by casting a rigid adhesive material 26 such as epoxy resin onto the prismlet assembly and attaching the plate, preferably before cure takes place. The matrix 26 embraces the faces 16c, d, and 18c, d, of the individual elongated prisms. FIGURE 6 illustrates also that the angle and shape of the bases 16d of the prismlets may be altered from those in the preceding views to form a light trap for the light that would otherwise scatter from the base.

This principle of the light trap is further exemplified in the embodiment shown in FIGURE 7. This multiprism requires no matrix and is made by a different process from either of the two embodiments above. The prismlets in this form are not triangular but behave optically as if they were, the difference being that the former base indicated in broken line at 16e has been transformed into a roughly triangular pocket which forms an effective light trap. This is illustrated by the arrow 27. The prismlets are provided with a reflective coating 28 on their back faces 18e, and they are cemented to each other as indicated at 30 along the back faces. A notch 32 filled with this cement strengthens the structure and improves the light trapping.

The individual prisms in the prism units or multiprisms illustrated in the several views function together as a single prism. The front light receiving faces 14a, 14b, etc., are oriented for exposure to a light source. The front entrance faces and the back cooperating faces 18a, 18b etc. are oriented for functioning as a single prism. In the embodiments of FIGURES 2–7, they provide parallel refraction in the same direction of light of the same wave length. In FIGURES 2–6 and 19, the back cooperating faces may reflect or transmit light. In the latter case by providing an opening 25 in the matrix 22 or 26, and in the plate 24 as shown in FIGURE 19. Reflection may be effected in FIGURES 2–7 by coating the back faces or providing a reflective surface behind them. The prisms preferably are aligned in vertex-to-base relationship, and with the front, light entrance faces lying in a common plane, in the manner illustrated.

The basic multiprism in any of the forms of FIGURES 2–7 possesses a number of advantages over prior art prisms. The whole section of material beyond the outline in FIGURE 1 has been eliminated. Since some prism materials are expensive, this represents a considerable saving in cost and, in the case of some materials which are hard to secure in large, unflawed pieces, this may make a formerly prohibitively priced prism possible.

A further advantage of the multiprism is its low weight compared to the conventional prism. This minimizes problems in instrumental design of mounting, pivoting, guiding, and protecting from mechanical damage. Furthermore, the overall shape and construction of the multiprism is more amenable to simple mounting methods.

Another important advantage of the multiprism is its optical "thinness." It will be apparent on inspection that the total distance through which the optical beam travels in the material of the multiprism is less at any place across the whole width of the multiprism than it is at any place across the face of the conventional prism except near the vertex. This means that the user of the prism can approach much closer to the absorption limits of the material without excessive loss of light in the multiprism than he can in the prior art prism. It further means that when the absorption limit is approached, the beam is attenuated evenly over its whole width rather than being progressively darkened from the edge adjacent to the prism vertex. Since in many spectrophotometers a nonuniform darkening of the beam introduces serious photometric errors, a serious source of instrumental error is thus eliminated by the multiprism. Furthermore, some very desirable optical materials such as synthetic quartz have impurity bands which prevent them from being used in certain wave length regions in the thickness required by conventional prisms; with the multiprism, their use becomes entirely practical. In the case of materials prone to internal scattering, the optical thinness of the multiprism is a great aid to the reduction of scattering effects such as stray light error. This reduction of stray light is further aided by the elimination of scattering from the base in the constructions shown in FIGURES 6 and 7, where the base has been moved out of the boundaries of the conventional prism to where it cannot be a source of scattering and where, in fact, the pocket so formed becomes a light trap to catch and suppress scattered light in a way not effective in the conventional prism.

The advantages of the new multiprism are illustrated in the monochromator embodiments of FIGURES 17 and 18. In the simple Littrow monochromator of FIGURE 17, the entrance slit is indicated at $S_1$ and the exit slit at $S_2$. Two curved mirrors $M_1$ and $M_2$ are interposed in the light path. The multiprism MP is rotated as indicated at MP' to vary the wave length. In the double dispersion Bunsen monochromator of FIGURE 18, $S_1$ and $S_2$ are the entrance and exit slits, respectively. Two lenses $L_1$ and $L_2$ are interposed in the light path. The two multiprisms $MP_1$ and $MP_2$ require less room than one conventional prism. The multiprism is also employed advantageously in spectrophotometers and in spectrographs.

A series of modifications of the basic multiprism may be made, which give it additional advantages not possible in any prior art prism. The first of these is the use of a plurality of materials in the several prism elements. As a simple example of this, half of the elements can be made of synthetic quartz and half of another fused quartz, the former having very high transmission in the range from 160 millimicrons up through the visible but having a pronounced absorption band at 2.7 microns, and the latter having little transmission under 200 millimicrons but having no absorption band at 2.7 microns. Both have the same dispersion curve to a sufficient degree of accuracy for use in a secondary dispersing means. In the simplest form, alternating prismlets of the two materials are used. The resulting multiprism transmits well over the total range from 160 to well above 4000 mm$\mu$. No single prior art fused quartz prism has this uninterrupted wave length range. This arrangement does attenuate alternate strips of the beam in the low transmission regions of one or the other material and thus lose light, although the beam remains homogeneous to a degree impossible if it were attempted to put two conventional prisms side by side, and furthermore there is no hole in the center of the beam such as would be produced by the thick base of one of the conventional prisms. There is, however, a more sophisticated arrangement to which the multiprism is well adapted which does not result in a loss of light. All the synthetic, high UV quartz can be placed at one end and all the high IR quartz at the other end of the multiprism, and the multiprism is then translated laterally as it is rotated to change wave length. In the UV, the beam strikes only on the synthetic quartz, while in progressing to the IR, the beam moves across the multiprism to the region composed only of high IR quartz. This cannot be done with conventional prisms without causing an objectionable dark strip to move across the beam in mid range. So by using a multiprism of two materials and translating as well as rotating it, an efficient range of operation can be achieved which is impossible with prior art prisms.

This principle can be further developed. The multiprism can be made of two or more materials of different dispersion curves, so as to produce a new synthetic dispersion curve not found in any known material. This is done by placing some such material as quartz at the UV end of the prism so as to use its high dispersion range. As 300 mm$\mu$ is approached the multiprism is gradually changed into glass with a different prism angle to match the deviation of the quartz. Above 300 mm$\mu$, the glass takes over but has improved dispersion over quartz, the beam leaving the quartz as the multiprism translates and passing onto the glass section. This process can be extended from one material to another as far as desired. As a secondary dispersion means, the doubling of the beam between regions where the deviation curves draw apart is not serious. The ability to maintain high dispersion over a greatly extended range is unknown to prior art prisms and is a novel advantage of the multiprism.

An additional variant on the above form of multiprism involves the use of selective multilayer reflecting coatings of the broad band type on the reflecting surfaces of the prism elements instead of simple aluminized surfaces. These coatings are selected to reflect in the particular wave length region for each prismlet that the particular prismlet is to transmit. As the beam moves from, say quartz to glass with increasing wave length, the coating on the back of the quartz sections cuts off and ceases reflecting at the increased wave lengths, while at the same time, the coatings on the glass cut in, thus eliminating the doubling of the beam due to the drawing apart of the deviation angles for the quartz and for the glass. This feature adapts the multiprism for use as a primary dispersion means.

All the foregoing are variants on the basic multiprism with plane entrance and reflection faces. It will be apparent that the scope of the multiprism principle is very wide and limited only by the ingenuity and requirements of the designer of the particular multiprism. It will also be apparent to one skilled in the art that the above description does not exhaust the possible variants on this principle even for the basic multiprism. For brevity, the description will now be directed to variants of the multiprism which include its secondary function of changing the convergence or divergence of the beam. This function involves the use of surfaces on the prism elements which have power, i.e., are curved rather than plane.

The classic conventional or prior art prism which has power is the Fery prism, having curved front and back faces. Its purpose is to dispense with a collimator mirror having a spherically curved surface, the function of forming an image of the entrance slit at the plane of the exit slit normally performed by such a curved collimator mirror now being performed by the curved surfaces of the prism. As used by Fery and later in a commercial spectrophotometer, its only advantage was some reduction in chromatic aberration from that caused by a spherical collimator with an off-axis prism. Properly the faces of this prism should be based on the logarithmic spiral but for practical purposes the surfaces are spherical. Short radii, large aperture ratios and short focal lengths are not very practical with this prism and a serious defect of the prism is its large astigmatism which causes points on the entrance slit to be imaged as lines of some length at the exit slit. Because of these disadvantages, it has still proved expedient when using this prism to fold the optical system to keep the instrument from being too long, so that the cost of the collimator mirror has not been eliminated; it has simply been changed into that of a flat mirror, which is essentially the same.

A multiprism which also performs the functions of the Fery prism is shown in FIGURE 8. The corresponding curved faces are numbered as before, 14*f* and 18*f*. The bases 16*f* may, as in the basic multiprism, be of any shape. While FIGURE 8 shows surfaces 18*f* as being segments of the back face of the Fery prism, it will be apparent to one skilled in the art art that a more suitable shape may be used if required. It will be further apparent that the multiprism may be "bent" in either direction, e.g., as illustrated for the face surface by the broken line 34, thus allowing the designer a greater degree of freedom than that afforded by the prior art prism to reduce the aberrations previously mentioned as characteristic of the Fery prism. It also will be apparent that the prism elements need not be of identical width, nor need they even be linear axially if an axially curved element is better. This latter point is illustrated in FIGURE 9. A multiprism 36 includes curved entrance surfaces 14*g* and reflecting surfaces 18*g*, and axial curvature of the elongated elements 38. The curvature of the surfaces may be spheric or aspheric.

The embodiments of FIGURES 8 and 9 have their front faces 14*f*, 14*g* and their back faces 18*f*, 18*g* oriented for refraction in the same direction to focus light of the same wave length. The front faces of the individual prisms lie in a common curved surface on each prism unit.

Since the curved multiprism is more flexible from a design standpoint than the Fery prism, it may be made to a shorter focal length and may dispense with both collimator and plano folding mirror. This eliminates from the system two reflections with their losses and liability to scattering errors. It reduces the cost of the system. It further simplifies realization of the wider range of operation and the other advantages enumerated above for the basic multiprism, also characteristic of the curved surface prism.

The optical prism units may be manufactured in several ways. Three methods of construction are illustrated, having an increasing degree of flexibility.

The first method results in a one piece or monolithic basic multiprism. Referring to FIGURE 10, a flat blank 46 of the material to be used, e.g., quartz, is ground and polished optically flat on one surface, then blocked onto a supporting base 40. The base may be a flat metal plate on which the blank is adhered in the conventional manner using pitch or other suitable adhesive. The blocked piece is then placed in a machine of the type known commercially as the Cavitron, which is equipped with an ultrasonic power unit which can vibrate a tool 42 in the direction 44 normal to the piece at a frequency of several tens of kilocycles per second over an amplitude of several hundredths of an inch or less. The tool has previously been shaped by conventional grinding methods to a form which is the reverse of that desired on the multiprism. A typical material for the tool is 440C stainless steel hardened to about 45 Rockwell C. By feeding a suitable abrasive such as boron nitride between the tool 42 and the work 46, the work will rapidly take the shape of the tool being fed into its surface, the time required to complete the forming of the work being one or two minutes. Polishing requires a loaded or hard pitch tool of the same shape as the work. This may be pressed to shape on the work or, better, on an accurate form having several more steps than the number of prismlets of the work. This tool is charged with Barnesite or other suitable polishing material and worked against the work in narrow random ellipses whose minor axis is as shown at 48 and whose major axis is parallel to the grooves in the work. At intervals the polishing tool is moved laterally the distance of one groove interval. The amplitude of motion of the tool must be small to avoid rounding the edges of the faces. Ultrasonic drive of this tool greatly reduces the polishing time. It is also possible to provide a pseudo-polish with a metal lap of the proper shape charged with diamond polishing compound. After polishing, the surfaces 18*b* may be given the proper reflective coat as a last step.

The difficulty of maintaining the flatness of the faces 18*b* during the polishing operation is a limitation of this method of manufacture, which is overcome in the following methods producing the nonmonolithic structures.

To arrive at the form of multiprism shown in FIGURE 7, a number of pieces or sheets of the prism material are ground and polished plano to the required accuracy on one face, and are ground plane parallel but not necessarily polished on the other face. Referring to FIGURE 11, these elements are indicated at 50, the polished face of each being on the under side as shown at 18*e*. Each piece is long enough to produce several multiprisms. The degree of plane parallelism between the upper and lower face of each piece depends on the accuracy to which the vertex angles of the prismlets must be held, but this can be more easily controlled than can the vertex angle of the conventional prism. Each piece is aluminized or otherwise reflectively coated on the polished side 18*e* to subsequently give the reflecting face of the multiprism. A plurality of grooves 32 of optional shape are then cut in each piece to form anchors for the cement holding the assembled multiprism together and also to improve the effectiveness of the light trapping. These grooves may be omitted without invalidating the process, or additional grooves may be added either in the bottom or top face of the piece, the only restriction being that these grooves do not enter the area of face 18*e* on the bottom side of the piece nor enter the volume of the prismlet defined by faces 14*e*, 18*e* and the dotted line 16*e* at the lower right corner of FIG. 11. After grooving, the pieces are laid up into a skewed pile or stack as shown, the angle of skew being approximately the vertex angle of a prismlet. Between each layer is a thin film of a cement such as a low viscosity, room temperature curing epoxy. The stack is allowed to cure without heating or applying any pressure which would cause strains to be set up in the elements. After cure the stack is sawed into transverse slabs, along parallel planes 52, using a diamond saw, the angle of the planes being held to as near that of the vertex angle as practical. The resulting slabs are reblocked to give the exact vertex angle between faces 18*e* and the top faces 14*e* when the face surface is ground plano and polished as the final operation.

This second method depends on the plane parallelism of the initial pieces. The process is somewhat wasteful of material and best adapted to the particular form of multiprism shown in FIGURE 7. The following method of manufacture of the multiprism is far more flexible and less expensive.

The basic principle which must be followed to secure an accurate finished multiprism is that the individual elements must be under complete control as to position from the start of the fabrication process to the finished unit. As these pieces are small and easily distorted they must at all times be held by a rigid, larger piece that can be guided, and held in position. FIGURES 12–16 illustrate the method used to effect this control. Referring to FIGURE 12, a stack of metal supporting plates 54 is employed, which includes plates that may be about 3 inches long by 2 inches wide by 0.1 inch thick. These plates or "dops" as referred to in the gem cutting industry, are clamped between two heavier metal end members 56 and 58 by suitable means such as a through bolt 60 passing through the stack. The plates and end members are all finished on all faces to be accurately rectangular, and the adjoining surfaces are accurately ground plane parallel. The illustrative equipment is designed for making a basic multiprism; for a multiprism with curved surfaces, the tooling is appropriately modified.

To the top of each supporting plate 54 is attached by blocking pitch or other suitable material a rod 60 of the material from which the multiprism is to be made. In the most elementary form, this rod is the same size as the top of the plate and of somewhat greater thickness that the final prismlet's base width. It may be preground to size or attached first to the plate and then ground to correspond to the thickness of the plate. The assembly is wrung down on a surface plate so that the bottom surface 62 is flat before clamping. Suitable protecting bars 64 are added around and surface 66 is polished plano to the required degree of accuracy. The proper reflecting coat is then applied to surface 66 if desired. This surface will become the prism back faces 18c.

The stack is next unclamped and reassembled with skewed end pieces 68 and 70, with the bottom end of every supporting plate squarely in contact along the edge thereof with a supporting surface 72 which is accurately plane parallel with the base surface 74 on the end piece 68. The angle of skew must accurately be the vertex angle to be formed on the prismlets. The accuracy of alignment of the prism faces 18c can be easily checked by optical methods before the next step and any necessary corrections made. A suitable dam 76, which may be rubber, Teflon, or other nonsticking material, is placed around the area of the skewed, coated prism blanks. The hardenable fluid matrix material 26, e.g., epoxy resin material, is cast into this area and a backing plate 24 adhered, if used. A transparent multiprism can alternatively be made for use as a Bunsen prism or with a separate Littrow mirror by omitting a reflecting coating and blocking off the central part of the area to confine the matrix to a frame around the central clear aperture 25 shown in FIGURE 19. In either case, the matrix is cured at room temperature to avoid strains in the assembly.

The back 78 of the matrix backing plate can then be ground parallel to base plane 74 which is plane parallel to the supporting surface 72, to simplify the establishment of the vertex angle in the final step. This operation can be omitted and shimming used in the final step with an optical test for angle. The clamps are next removed and the supporting plates 54 separated from the cemented assembly by chilling or other suitable means, leaving the assembly shown in FIGURE 14. As the last step, this is blocked against the plate back 24 and ground and polished to a plane 80, parallel to the back 78, to complete the multiprism.

The above method is readily adaptable, as will be apparent to one skilled in the art, to multiprisms with curved bases. For example, by inserting a plane parallel shim 82, as is shown in FIGURE 15, it is possible to start with round rods 84 which are much easier to secure in some materials such as fused quartz. In this case the rods are centerless ground to equal size before attaching to the supporting plates 54, tangent to one face 84 on each plate. After the rods are ground flat to the diameter and reflectively coated, when desired, to produce flat back faces 18h, the plates are skewed as in FIGURE 16 with the shims removed. The ground rods are embedded in the matrix and finished as described for the embodiment of FIGURES 13 and 14, grinding the rods to a plane 86 to provide front faces 14h on the resulting prisms. The final prisms have curved bases 16h which form excellent light traps.

It will be apparent that the optical prism unit and the methods of manufacture may be changed and modified from the preferred embodiments described and illustrated, within the spirit and scope of the invention. It is intended that such changes and modifications be included within the scope of the appended claims.

What I claim as new and desire to secure by Letters Patent of the United States is:

1. An optical prism unit for dispersing rays of light characterized by light weight, low light absorption, and high resolution which comprises a plurality of thin individual elongated prisms, each prism having sides joining at one apex thereof ground and polished optically flat to serve as entrance and cooperating faces respectively for light rays to be dispersed, and a base face opposite said apex, said prisms being embedded in a matrix in side by side alignment with said light entrance faces and said apexes of each disposed in a single optically flat plane which forms the light-receiving face of the prism unit, said matrix embracing said cooperating and base faces to secure permanently the prisms together and being so disposed within said optical unit that the light rays do not enter the matrix material.

2. The optical prism unit of claim 1 in which said cooperating face is coated with a light reflective material so that the light rays are reflected without entering said matrix.

3. The optical prism unit of claim 1 in which said matrix embraces said cooperating and base faces near the extremities of said elongated prisms to leave an area free of matrix material so that light rays may pass directly from the prism unit through said cooperating faces in said area without entering the matrix material.

4. The optical prism unit of claim 1 in which said individual prisms are made from different materials having distinct light dispersing properties to provide a prism unit which functions effectively over a broad range of wave lengths.

5. An optical prism unit for dispersing rays of light characterized by light weight, low light absorption and high resolution which comprises a plurality of individual elongated dispersing prisms arranged side by side in a matrix in a linearly extended array, each prism having two curved sides joining at one apex thereof ground and polished to a predetermined curvature to serve as entrance and cooperating faces respectively for light rays to be dispersed, and a base face opposite said apex, the angle subtended by the polished faces of each prism being of varying magnitude so that said light rays having a common wave length are refracted to a common focus peculiar to that particular wave length, said entrance faces of each prism being disposed in a common curved surface, said matrix embracing said cooperating and base faces to secure permanently the prisms together and being so disposed within said optical unit that the light rays do not enter the matrix material.

References Cited by the Examiner

UNITED STATES PATENTS

| | | | |
|---|---|---|---|
| 312,290 | 2/1885 | Pennycuick | 88—60 |
| 578,620 | 3/1897 | Barker | 88—57 |
| 596,883 | 1/1898 | Jacobs | 88—60 |
| 982,772 | 1/1911 | Hadsworth | 88—60 |
| 1,434,167 | 10/1922 | Thorner. | |
| 1,806,864 | 5/1931 | Pallemaerts | 88—1 |
| 1,872,501 | 8/1932 | Rehlander | 88—1 |
| 2,394,645 | 2/1946 | Turner et al. | 51—216 |
| 2,466,455 | 4/1949 | Luboshez | 88—1 |
| 2,499,453 | 3/1950 | Bonnet | 88—1 X |
| 2,807,922 | 10/1957 | Newcomer et al. | 51—284 |
| 2,855,819 | 10/1958 | Luboshez | 88—1 |

FOREIGN PATENTS

| | | |
|---|---|---|
| 1,079,743 | 12/1954 | France. |
| 1,089,184 | 9/1960 | Germany. |
| 376,982 | 7/1932 | Great Britain. |
| 458,509 | 12/1936 | Great Britain. |
| 902,535 | 8/1962 | Great Britain. |

JEWELL H. PEDERSEN, *Primary Examiner.*

EMIL S. ANDERSON, *Examiner.*

EDWARD J. CONNORS, WILLIAM L. SIKES,
*Assistant Examiners.*